Patented Feb. 7, 1928.

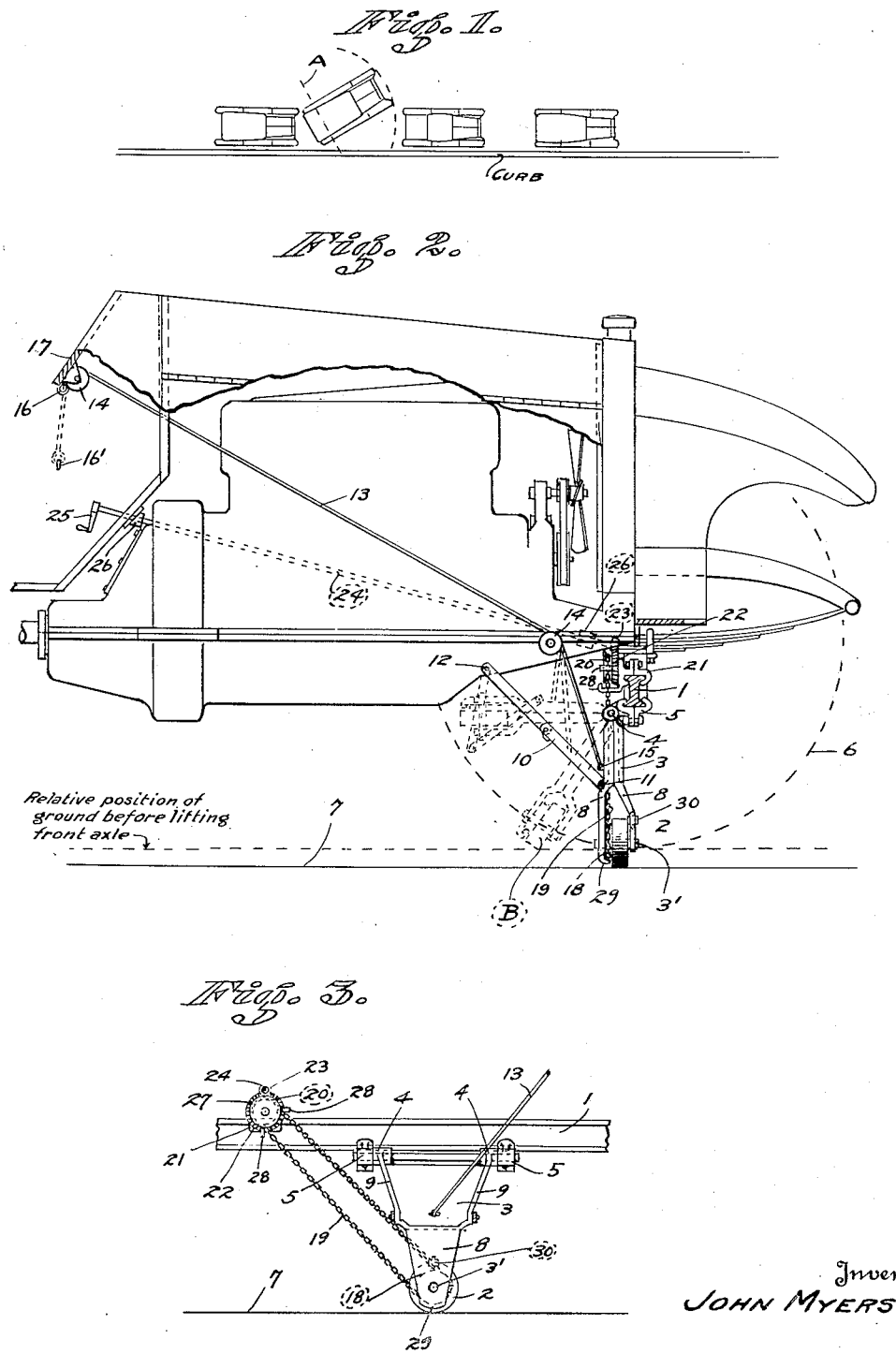

1,658,297

UNITED STATES PATENT OFFICE.

JOHN MYERS, OF OROVILLE, CALIFORNIA.

PARKING WHEEL FOR AUTOMOBILES.

Application filed September 9, 1924. Serial No. 736,727.

This invention relates to automobiles and to a means for moving the front end of the vehicle laterally for horizontal parking in confined spaces, or for turning the vehicle completely around.

The objects of my invention are to provide an auxiliary device which may easily be secured to the forward end of any automobile and which may be thrown into operative relation with the ground whereby upon backing up the automobile slightly, the front wheels are lifted from the ground, and further the provision of a revolvable wheel or roller on the device contacting the ground arranged to take the weight of the front end of the vehicle and with its plane of rotation disposed transversely to the vehicle whereby the front end of the vehicle may be rolled laterally upon this wheel while the rear drive wheels revolve in opposite directions by reason of the differential, thus converting the automobile into a three wheel turntable, as it were, and a further object is to provide means for revolving the auxiliary transversely disposed wheel, preferably by the driver of the vehicle from his position on the seat, whereby the front end of the vehicle may be swung in and out of horizontal parking position against a curb, or other short, or complete turns made in congested highway areas, for by the arrangements contemplated the car may be revolved in its own length.

In contemplating my invention as outlined, it will be manifest that many modifications in arrangement of apparatus and means of applying power to the wheel for revolving it may be advanced by any mechanic, tho in the drawings hereto but one method of reduction to practise is shown as sufficiently illustrative, but I do not wish to be confined specifically to this one construction unless forced to do so by the prior art.

In the drawings hereto Figure 1 is a reduced plan of a portion of one side of a street with automobiles horizontally parked and with a car embodying my improvements with a dotted arcuate line in front of it indicating the movement of its front end in and out of a short parking space in which it ordinarily could not be parked.

Figure 2 is a sectional elevation of the forward under part of an automobile showing the front axle and my auxiliary parking wheel and bracket may be pulled up to the axle and with the wheel against the ground.

Figure 3 is an elevation of the wheel and bracket as seen from a position under the automobile looking toward the front axle.

In further detail, 1 is the front axle, 2 my parking wheel carried on a bracket 3 hinged at 4 to a clamp 5, 6 one of the wheels of the vehicle lifted from the ground 7 by my parking wheel standing in an upright position on its bracket under the front axle.

The bracket may be of any suitable construction, but is here shown as comprised of two plates 8 suitably flanged at 9 to stiffen them and carrying the wheel 2 on an axle 3', and the wheel may revolve on the axle or the axle in the plates, or both, and any type of bearing may be used, either plain or ball bearing, depending on the permissible cost of the article for a given automobile, or the weight of same, for it is manifest that plain bearings may be satisfactory on a light car whereas heavy roller bearings might be required on a large truck, and such construction being a mere matter of well known detail, is not attempted in the drawings. One or more rollers 30 support the parking wheel while bringing the bracket in and out of the vertical position.

The bracket is prevented from swinging beyond the vertical position shown by suitable hinged braces 10 pivoted at 11 to the bracket flanges and at 12 to the engine casting or other substantial part of the vehicle, and the braces are so arranged in their pivotal construction that they are always free to fold up to permit the parking wheel and bracket to swing backward upon starting the engine and running the car forward, and after which the weight of the car being once more taken up by the front wheels, the parking wheel and bracket may be pulled up to a horizontal position, as indicated in dotted lines in Figure 2 of the drawing.

A simple way of doing this is to extend a small cable 13 from the driver's compartment passing over idlers 14 and connected to a flange of the bracket at 15. The cable may conveniently have a ring 16 on the driver's end adapted to be held in a hook 16' in the side of the vehicle to hold the bracket elevated for road clearance.

When it is desired to park in a confined space, the vehicle is backed into the space as far as the dotted line "A" in Figure 1, then the clutch is thrown out and the parking wheel is dropped to the ground to stop in contact therewith at an angle to the vehicle as indicated at "B" in Figure 2, and whereupon the engine is again applied to back the car a trifle more, and the parking wheel gripping the road will straighten the bracket under the front axle lifting the front wheels from the ground with a toggle like action. The driver stops the engine or disengages the clutch when he sees the ring 16 reach the limit of its travel against the instrument board 17, and the front of the vehicle is then free to swing in and out of parking position.

For automobiles which are too heavy to roll in or out by pulling or pushing the front end, I provide means of applying power to revolve the parking wheel in either direction, and in the arrangement shown, this means takes the form of a chain wheel 18 on the side of the parking wheel and around which passes a chain 19 again passing over a smaller chain wheel 20 revolvably supported on a bracket 21 clamped to the axle to one side of the bracket 3.

The small wheel 20 is secured to a gear 22 which is in mesh with a pinion 23 carried on a shaft 24 extending to the driver's compartment, and provided with a hand crank 25.

The shaft 24 is supported in bearings 26 secured at suitable places to the vehicle, and the parking wheel may be forcibly revolved in either direction by turning the hand crank.

The small chain wheel is provided with a deep flange at 27 and a pair of guards 28 extend from the bracket 21 close to the chain so that it will not fall off when the bracket 3 is swung out of the vertical position, and the rear plate 8 of the bracket 3 is extended and turned over the chain wheel 18 at 29 to insure the chain always remaining in place on this wheel.

I have indicated the use of a standard coil chain 19 to permit greater freedom of the bracket to fold up, and the action is such as to throw a little slack into the chain upon folding the bracket, and straighten the chain into working alignment when the bracket is vertical.

Of course, other chains and well known forms of gear drives may be used but this is simple and cheap and the total travel of the chain over years of use is relatively so little that a common coil chain will give ample life and perfect satisfaction.

With attention to Figure 2, it will be seen that the parking wheel is shown as a flat rimmed roller and when in position B, the corner is impinged against the ground so as to get the initial grip thereagainst for lifting the front end of the vehicle when backed up, and it should be observed that the angle of the bracket with respect to the vertical when in this position, has a great deal to do with the effectiveness of the invention, for if the angle is too great the wheel will not grip the road.

In practise about 30 degrees has been found effective, and it has also been found that the wheel may be rubber tired and still give a good grip, but the corner of the iron wheel is more positive.

I claim:

1. A combination with a vehicle having front wheels, of an auxiliary wheel, means for pivotally securing said wheel to said vehicle, for permitting said wheel to be swung from inoperative to operative position, said wheel having a tire presenting a flat surface to the ground, means for limiting the movement of said wheel into operative position, means for moving said wheel into inoperative position and means for imparting a rotative movement to said wheel for causing said wheel to move the front of said vehicle laterally.

2. In a device of the type described, a parking wheel carried by a vehicle, means for moving said parking wheel into operative position, the axis of said wheel extending at an angle with respect to the front axle of the vehicle, said wheel having a tire with a flat exterior surface for presenting an edge of the wheel to the ground during the movement of said wheel into operative position.

JOHN MYERS.